(12) United States Patent
Wang et al.

(10) Patent No.: US 12,072,730 B2
(45) Date of Patent: Aug. 27, 2024

(54) SYNCHRONIZATION SIGNAL GENERATING CIRCUIT, CHIP AND SYNCHRONIZATION METHOD AND DEVICE, BASED ON MULTI-CORE ARCHITECTURE

(71) Applicant: Stream Computing Inc., Beijing (CN)

(72) Inventors: Weiwei Wang, Beijing (CN); Fei Luo, Beijing (CN)

(73) Assignee: Stream Computing Inc., Beijing (CN)

( * ) Notice: Subject to any disclaimer, the term of this patent is extended or adjusted under 35 U.S.C. 154(b) by 160 days.

(21) Appl. No.: 17/587,770

(22) Filed: Jan. 28, 2022

(65) Prior Publication Data

US 2022/0147097 A1 May 12, 2022

Related U.S. Application Data

(63) Continuation of application No. PCT/CN2020/096390, filed on Jun. 16, 2020.

(30) Foreign Application Priority Data

Aug. 23, 2019 (CN) .......................... 201910785053.1

(51) Int. Cl.
*G06F 1/12* (2006.01)

(52) U.S. Cl.
CPC ...................... *G06F 1/12* (2013.01)

(58) Field of Classification Search
CPC ......... G06F 15/17325; G06F 15/17337; G06F 15/1735; G06F 1/04; G06F 1/12; H04W 56/00
See application file for complete search history.

(56) References Cited

U.S. PATENT DOCUMENTS

| 5,083,265 A | 1/1992 | Valiant |
| 5,434,995 A | 7/1995 | Oberlin et al. |

(Continued)

FOREIGN PATENT DOCUMENTS

| CN | 103377032 A | 10/2013 |
| CN | 106547237 A | 3/2017 |
| WO | 2019126921 | 7/2019 |

OTHER PUBLICATIONS

International Search Report for PCT Application No. PCT/CN2020/096390, dated Sep. 18, 2020.

(Continued)

*Primary Examiner* — Raymond N Phan
(74) *Attorney, Agent, or Firm* — Andrus Intellectual Property Law, LLP

(57) ABSTRACT

The present disclosure provides a synchronization signal generating circuit, a chip, and a synchronization method and a synchronization device, based on a multi-core architecture, configured to generate a synchronization signal for M node groups, wherein each of the node groups includes at least one node, and M is an integer greater than or equal to 1. The synchronization signal generating circuit includes: a synchronization signal generating sub-circuit and M group ready signal generating sub-circuits. The M group ready signal generating sub-circuits are in one-to-one correspondence with the M node groups. The synchronization signal generating sub-circuit generates a first synchronization signal based on the first to-be-started signal, wherein the first synchronization signal is configured to instruct the K nodes in the first node group to start synchronization.

18 Claims, 6 Drawing Sheets

(56) References Cited

U.S. PATENT DOCUMENTS

| | | | | |
|---|---|---|---|---|
| 5,928,351 A | * | 7/1999 | Horie | G06F 9/52 |
| | | | | 712/13 |
| 6,216,174 B1 | | 4/2001 | Scott et al. | |
| 2010/0177828 A1 | | 7/2010 | Rubinstein et al. | |
| 2013/0227328 A1 | * | 8/2013 | Ishii | G06F 1/12 |
| | | | | 713/375 |
| 2015/0339173 A1 | * | 11/2015 | Champseix | G06F 9/522 |
| | | | | 718/102 |
| 2016/0170813 A1 | * | 6/2016 | Robison | G06F 9/522 |
| | | | | 718/106 |
| 2016/0364835 A1 | | 12/2016 | Srebnik et al. | |
| 2019/0121641 A1 | * | 4/2019 | Knowles | G06F 9/30087 |
| 2021/0073049 A1 | * | 3/2021 | Nakagawa | G06F 16/2246 |
| 2022/0070801 A1 | * | 3/2022 | Satoh | G01D 21/02 |

OTHER PUBLICATIONS

Extended European Search Report for European Application No. 20856466.6, dated Jul. 22, 2022.

* cited by examiner

SYNCHRONIZATION SIGNAL GENERATING CIRCUIT, CHIP AND SYNCHRONIZATION METHOD AND DEVICE, BASED ON MULTI-CORE ARCHITECTURE

CROSS-REFERENCE TO RELATED APPLICATION

This application is a continuation application of International Patent Application No. PCT/CN2020/096390, filed on Jun. 16, 2020, which in turn claims priority to Chinese Patent Application No. 201910785053.1 filed on Aug. 23, 2019, the entire contents of which are incorporated herein by reference for all purposes.

TECHNICAL FIELD

The present disclosure relates to a synchronization signal generating circuit, a chip, and a related method and device, based on a multi-core architecture.

BACKGROUND

With the development of science and technology, human society is rapidly entering an era of intelligence. The important feature of the era of intelligence is that people may acquire more and more types of data, the amount of data that people may acquire is becoming larger and larger, and the demand for the data processing speed is becoming higher and higher. Chips are the cornerstone of data processing, which essentially determines the ability to process data. In order to improve the data processing capability of the chip, in addition to improving the processing speed of the chip and adopting the customized and dedicated chip, a parallel computing model between chips is also a current research hotspot.

Among existing parallel computing models, the Bulk Synchronous Parallel (BSP) computing model is an overall synchronous parallel computing model, which may be used in a system-level application, such as a computer cluster composed of multiple servers, for parallel computing, or may be used in a chip-level application, such as a multi-core chip, for parallel computing. The BSI' computing model may effectively avoid deadlocks, conceal specific interconnection network topologies, and simplify communication protocols, and may also make global synchronization achieved in hardware by means of barrier synchronization within a controllable coarse-grained level, thereby providing an effective way to execute a tight coupled synchronous parallel algorithm.

However, in a current BSP computing model, each of nodes sends a message to the controller through a bus or an on-chip network, which has a large delay. When the number of nodes is large, loads of the bus or the on-chip network will be significantly increased, and the controller needs to process the message sent by each of nodes, and therefore, the efficiency of signal transmission between the controller and the nodes is low, the delay is large, which increases an error of the overall system. In order to reduce this error, it is often to increase the complexity of the software that controls each of nodes, resulting in a further reduction in the efficiency of the overall system.

SUMMARY

The present disclosure has been accomplished in view of the prior art described above, and aims to provide a synchronous parallel processing device and a control method therefor, based on a multi-core architecture, which can reduce overall delay, improve efficiency of signal transmission, and reduce transmission burden.

To this end, a first aspect of the present disclosure provides a synchronization signal generating circuit. The synchronization signal generating circuit is configured to generate a synchronization signal for M node groups, each of the node groups including at least one node, and M being an integer greater than or equal to 1; the synchronization signal generating circuit includes a synchronization signal generating sub-circuit and M group ready signal generating sub-circuits; the M group ready signal generating sub-circuits are in one-to-one correspondence with the M node groups; a first group ready signal generating sub-circuit of the M group ready signal generating sub-circuits is connected to K nodes in a first node group to be synchronized, wherein the first group ready signal generating sub-circuit is configured to generate a first to-be-started signal for the first node group to be synchronized, and K is art integer greater than or equal to 1; output terminals of the M group ready signal generating sub-circuits are connected to the synchronization signal generating sub-circuit; and the synchronization signal generating sub-circuit generates a first synchronization signal based on the first to-be-started signal, wherein the first synchronization signal is configured to instruct the K nodes in the first node group to start synchronization.

With respect to the synchronization signal generating circuit according to the first aspect of the present disclosure, the M group ready signal generating sub-circuits are in one-to-one correspondence with the M node groups; the first group ready signal generating sub-circuit is connected to the K nodes in the first node group to be synchronized; the first group ready signal generating sub-circuit is configured to generate the first to-be-started signal for the first node group to be synchronized; the synchronization signal generating sub-circuit generates the first synchronization signal based on the first to-be-started signal, and the K nodes in the first node group start synchronization. Thus, it is possible for the synchronization signal generating sub-circuit to process multiple to-be-started signals simultaneously, and it is possible to independently transmit signals by the M group ready signal generating sub-circuits and the synchronization signal generating sub-circuit.

In addition, with respect to the synchronization signal generating circuit according to the first aspect of the present disclosure, optionally, the first group ready signal generating sub-circuit is configured to generate the first to-be-started signal for the first node group to be synchronized, including: the first group ready signal generating sub-circuit is configured to generate the first to-be-started signal based on ready signals from all K nodes in the first node group to be synchronized. In this case, it can be known based on the first to-be-started signal whether all K nodes in the first node group enter an idle state. Thus, it is possible to ensure that all K nodes in the first node group may perform operations synchronously and parallelly.

In addition, with respect to the synchronization signal generating circuit according to the first aspect of the present disclosure, optionally, the synchronization signal generating sub-circuit includes: M shields, M to-be-synchronized group indicators, and M group synchronization signal generating sub-circuits; the M to-be-synchronized group indicators are respectively connected to the NI shields; an input terminal of each of the M shields is connected to the output terminals of the M group ready signal generating sub-circuits; output terminals of the M shields are respectively connected to corresponding sub-circuits of the M group synchronization signal generating sub-circuits; a first shield of the M shields outputs a first group quasi-synchronization signal based on an instruction from a first to-be-synchronized group indicator connected to the first shield; and a first group synchronization signal generating sub-circuit of the M group synchronization signal generating sub-circuits generates a first group synchronization signal based on the first group quasi-synchronization signal. In this case, the first shield shields the to-be-started signals for other groups and outputs the first group quasi-synchronization signal based on the instruction from the first to-be-synchronized group indicator connected to the first shield, and the first group synchronization signal generating sub-circuit generates the first group synchronization signal based on the first group quasi-synchronization signal. Thus, it is possible to determine by the first shield whether to generate the first group synchronization signal.

In addition, with respect to the synchronization signal generating circuit according to the first aspect of the present disclosure, optionally, the to-be-synchronized group indicator includes a register; the register includes at least M register bits, the M register bits are in one-to-one correspondence with the M node groups, and a register bit in the M register bits corresponding to the first node group to be synchronized is configured as a first value, and register hits in the M register bits corresponding to node groups in the M node groups other than the first node group to be synchronized are configured as a second value. Thus, it is possible to select the register bit configured as the first value as required.

In addition, with respect to the synchronization signal generating circuit according to the first aspect of the present disclosure, optionally, the first synchronization signal is configured to instruct the K nodes in the first node group to start synchronization, including: the first synchronization signal is configured to instruct the K nodes in the first node group to start computing simultaneously, or to start transmitting data simultaneously. Thus, it is possible to determine that the K nodes in the first node group starts computing or transmitting data simultaneously.

Furthermore, a second aspect of the present disclosure provides a chip including; the synchronization signal generating circuit according to the first aspect described above and N processing nodes, wherein the N processing nodes are divided into M processing node groups, N is an integer greater than 1, and M is less than or equal to N.

With respect to the chip according to the second aspect of the present disclosure, the N processing nodes are divided into M processing node groups. Thus, the synchronization signal generating circuit may be in one-to-one correspondence with the M processing node groups, and may receive signals from and send signals to the M processing node groups.

In addition, with respect to the chip according to the second aspect of the present disclosure, optionally, the chip further includes N first communication hardware lines configured to transmit ready signals from the N processing nodes to corresponding group ready signal generating sub-circuits. In this case, the group ready signal generating sub-circuit is connected to each of processing nodes in a corresponding processing node group respectively and independently. Thus, it is possible to ensure that the ready signal generated by each of processing nodes is accurately sent to a corresponding group ready signal generating sub-circuit, and the transmission rate of the ready signal is increased.

In addition, with respect to the chip according to the second aspect of the present disclosure, optionally, the chip further includes N second communication hardware lines configured to transmit synchronization signals from the synchronization signal generating sub-circuit to corresponding processing nodes. In this case, the synchronization signal generating sub-circuit is connected to each of processing nodes in the corresponding processing node group respectively and independently. Thus, it is possible to ensure that synchronization signals generated by the synchronization signal generating sub-circuit are accurately sent to respective processing nodes in the corresponding processing node group, and the transmission rate of the synchronization signal is increased.

In addition, with respect to the chip according to the second aspect of the present disclosure, optionally, the chip further includes a controller configure to change setting of a register. Thus, it is possible to control a value of each of the register bits of the register by the controller, so as to control the shields.

In addition, with respect to the chip according to the second aspect of the present disclosure, optionally, the chip further includes a controller configured to control execution and allocation of tasks for each of processing nodes in the processing node group. Thus, it is possible to allocate tasks for each of processing nodes in the processing node group by the controller.

In addition, with respect to the chip according to the second aspect of the present disclosure, optionally, the N processing nodes include RISC-V cores. Thus, it is possible to flexibly program the chip based on general RISC-V basic instructions and extended instructions.

Furthermore, a third aspect of the present disclosure provides a synchronous parallel processing control method based on a multi-core architecture, being a synchronous parallel processing control method based on the synchronous parallel processing device according to any embodiment of the first aspect mentioned above, the method including: sending, by a first node, a ready signal to a group ready signal generating sub-circuit to which the first node is connected, when the first node in the node group enters an idle state; generating, by the group ready signal generating sub-circuit, a to-be-started signal in response to a state that all nodes in the node group have sent ready signals; generating, by a synchronization signal generating sub-circuit, a synchronization signal based on the to-be-started signal; and starting synchronization, by all nodes in the node group, in response to the synchronization signal received.

With respect to the synchronous parallel processing control method according to the third aspect of the present disclosure, the first node in the node group sends the ready signal to the group ready signal generating sub-circuit to which the first node is connected, when the first node in the node group enters an idle state; after receiving the ready signals from all nodes in the node group corresponding to the group ready signal generating sub-circuit, the group ready signal generating sub-circuit generates the to-be-started signal; and then the synchronization signal generating sub-circuit generates a corresponding synchronization signal; and all nodes in the node group start synchronization in response to the received synchronization signal, Thus, it is possible for the synchronization signal generating sub-circuit to process multiple to-be-started signals simultaneously, and it is possible to independently transmit signals by the group ready signal generating sub-circuits and the synchronization signal generating sub-circuit.

Furthermore, a fourth aspect of the present disclosure provides a synchronous parallel processing device based on a multi-core architecture, including: a processing circuitry, which has N processing nodes, wherein the N processing nodes are divided into M processing node groups, N is an integer greater than 1, and M is less than or equal to N; and a synchronization signal generating circuitry, which includes a synchronization signal generating sub-circuit and M group ready signal generating sub-circuits; wherein the M group ready signal generating sub-circuits are in one-to-one correspondence with the M node groups; a first group ready signal generating sub-circuit of the M group ready signal generating sub-circuits is connected to K nodes in a first node group to be synchronized, wherein the first group ready signal generating sub-circuit is configured to generate a first to-be-started signal for the first node group to be synchronized, and wherein K is an integer greater than or equal to 1; output terminals of the M group ready signal generating sub-circuits are connected to the synchronization signal generating sub-circuit; and the synchronization signal generating sub-circuit generates a first synchronization signal based on the first to-be-started signal, wherein the first synchronization signal is configured to instruct the K nodes in the first node group to start synchronization.

With respect to the synchronous parallel processing device according to the fourth aspect of the present disclosure, the M group ready signal generating sub-circuits are in one-to-one correspondence with the M node groups; and the first group ready signal generating sub-circuit is connected to the K nodes in the first node group to be synchronized, wherein the first group ready signal generating sub-circuit is configured to generate the first to-be-started signal for the first node group to be synchronized; the synchronization signal generating sub-circuit generates the first synchronization signal based on the first to-be-started signal; and the K nodes in the first node group start synchronization. Thus, it is possible for the synchronization signal generating sub-circuit to process multiple to-be-started signals simultaneously, and it is possible to independently, transmit signals by the M group ready signal generating sub-circuits and the synchronization signal generating sub-circuit.

In addition, with respect to the synchronous parallel processing device according to the fourth aspect of the present disclosure, optionally, the processing node is at least one of: a processing circuit, a processing chip, and a server. Thus, it is possible to select the implementation of the processing node based on actual applications.

Furthermore, a fifth aspect of the present disclosure provides a computing device including a processor and a memory, wherein the processor is configured to execute computer instructions stored in the memory, so that the computing device executes the synchronous parallel processing control method described above.

Furthermore, a sixth aspect of the present disclosure provides a computer readable storage medium storing a computer program which, upon execution by a processor, implements the steps of the synchronous parallel processing control method described above.

Furthermore, a seventh aspect of the present disclosure provides a computer program product including computer instructions which, upon execution by a computing device, cause the computing device to execute the synchronous parallel processing control method described above.

According to the present disclosure, it is possible to provide a synchronous parallel processing device, method and system, based on a multi-core architecture, which can reduce overall delay, improve efficiency of signal transmission, and reduce bus burden.

BRIEF DESCRIPTION OF THE DRAWINGS

The embodiments of the present disclosure will now be explained in further detail only by referring to the examples of the accompanying drawings, in which.

REFERENCE NUMERALS

Figure 1:
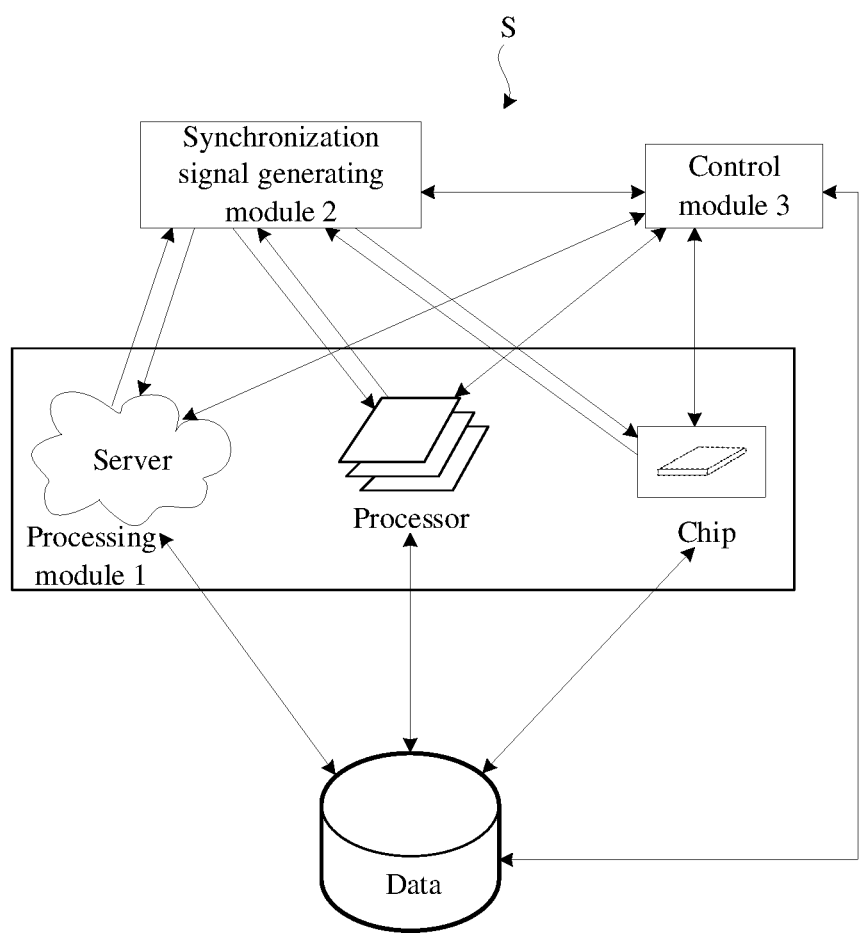
FIG. 1 is a schematic diagram showing a scenario where a synchronous parallel processing device according to an embodiment of the present disclosure is used for processing data.

1 . . . processing module, 10 . . . processing group, 101 . . . processor, 2 . . . synchronization signal generating module, 21 . . . group ready signal generating unit, 22 . . . synchronization signal generating unit, 221 . . . filter, 222 . . . register, 223 . . . synchronization signal generator, . . . control module.

DETAILED DESCRIPTION

Hereinafter, the present disclosure will be described in further detail in conjunction with the drawings and specific embodiments. In the drawings, the same components or the components having the same functions are marked with the same symbols, and a repetitive description thereof will be avoided. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in a different order, and/or in parallel. In addition, the method embodiments may include additional steps and/or omit the steps illustrated. The scope of the present disclosure is not limited in this regard.

The term "include" and its variations are used herein as an open inclusion, that is, "including, but not limited to". The term "based on" means "based, at least in part, on". The term "an embodiment" means "at least one embodiment". The term "another embodiment" means "at least one additional embodiment". The term "some embodiments" means "at least some embodiments". Relevant definitions of other terms will be given in the descriptions below.

It should be noted that the concepts such as "first" and "second" mentioned in the present disclosure are used only to distinguish between different apparatuses, modules or units, and are not intended to define the order or mutual interdependence of the functions performed by these apparatuses, modules or units. The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another. A unit or module may be implemented purely by software, purely by hardware, or by a combination of hardware and software. In a pure software implementation, for example, the unit or module may include functionally related code blocks or software components, that are directly or indirectly linked together, so as to perform a particular function. For example, a "group ready signal generating unit" may also be referred to as a "group ready signal generating sub-circuit".

It should be noted that the modifications of "one", "a" and "plurality of" referred to in the present disclosure are illustrative rather than limiting, and it should be understood by those skilled in the art to mean "one or more" unless the context clearly indicates otherwise.

The names of messages or information exchanged between the plurality of apparatuses in the embodiments of the present disclosure are used for illustrative purposes only and are not intended to limit the scope of the messages or information.

FIG. 1 is a schematic diagram showing an application scenario where a synchronous parallel processing device S according to an embodiment of the present disclosure is used for processing data.

The synchronous parallel processing device S based on a multi-core architecture according to an embodiment of the present disclosure may include a processing module 1 (i.e., processing circuitry), a synchronization signal generating module 2 (i.e., synchronization signal generating circuitry) and a control module (sometimes also referred to as "a control unit" or "a controller") 3. As shown in FIG. 1, the control module 3 acquires computing tasks that need to be processed (for example, massive image processing, big data processing, etc.). Then, the control module 3 may allocate the computing tasks to each of processing nodes (for example; a server, a processor 101, or a processing chip, etc.), and may configure the synchronization signal generating module 2. After receiving the computing tasks from the control module, the processing nodes on the chip process the respective tasks based on a synchronization signal from the synchronization signal generating module, and generate respective ready signals when the processing ends. Furthermore, the synchronization signal generating module 2 may receive the ready signals from each of processing nodes; and after receiving the ready signals, the synchronization signal generating module 2 generates a synchronization signal based on the configuration of the synchronization signal generating module 2 and sends the same to the processing nodes, so that the processing nodes start processing the next computing task after receiving the synchronization signal.

In the synchronous parallel processing device S, the processing module 1 may include at least one processing group (node group) 10, the processing group 10 may have multiple processors (nodes) 101 (sometimes also referred to as "cores"). The processors 101 may be in an idle state or in a non-idle state, and may generate ready signals when the processors 101 enter an idle state (see FIG. 2 described later). In addition, the synchronization signal generating module 2 may include a group ready signal generating unit 21 (i.e., group ready signal generating sub-circuit) and a synchronization signal generating unit 22 (i.e., synchronization signal generating sub-circuit), wherein the group ready signal generating unit 21 may be connected to each of processors 101 in the processing group 10 by hardware independently, and may generate a group ready signal (a to-be-started signal) based on the ready signals generated by each of processors 101 in the processing group 10. The synchronization signal generating unit 22 may be connected to each of processors 101 in the processing group 10 independently, and may receive the group ready signal generated by the group ready signal generating unit 21 and may generate a group synchronization signal (a synchronization signal) based on the group ready signal. Each of processors 101 in the processing group 10 enters a non-idle state upon receiving the group synchronization signal. The non-idle state includes a computing state and a transmitting state. For BSP synchronization, in the non-idle state, the computing may be performed first and the transmitting may be then performed, or vice versa, and the computing and the transmitting are completed within one synchronization cycle.

The idle state refers to a state that there are no tasks to be executed by a processing node in the processing group in the processing module after computing the received computing tasks and transmitting the processing results to the next processing core. In some examples, a processor 101 may issue a low-level signal when the processor 101 is in an idle state, and the processor 101 may issue a high-level signal when the processor 101 is in a non-idle state (see FIG. 8 described later).

In the synchronous parallel processing device S according to an embodiment of the present disclosure, each of the processors 101 in the processing group 10, upon entering the idle state, independently sends the ready signal to the group ready signal generating unit 21 in the synchronization signal generating module 2 corresponding to the processing group 10. The group ready signal generating unit 21 generates a group ready signal after receiving the ready signals from all processors 101 in the processing group 10 corresponding thereto; and then the synchronization signal generating unit 22 receives the group ready signal and generates a corresponding group synchronization signal, and finally sends the corresponding group synchronization signal to all processors 101 in the processing group 10, so that the processors 101 enter a non-idle state. Thus, it is possible for the synchronization signal generating unit 22 to process multiple group ready signals simultaneously, and it is possible to independently transmit signals by the group ready signal generating units and the synchronization signal generating unit 22 in the synchronous parallel processing device S.

In addition, as described above, the synchronous parallel processing device S may further include a control module 3 for allocating computing tasks. The control module 3 may be communicatively connected to the processing module 1 (described later) and the synchronization signal generating module 2 (described later); the control module 3 is communicatively connected to a register 222 (described later), and a state of the register 222 is controlled by the control module 3. Thus, the control module 3 is configured to allocate computing tasks to the processing module 1 and to control the state of the register 222.

In the synchronous parallel processing device S, the control module may calculate how many processing groups are needed to participate in the processing based on an estimated amount of computing necessary for the received computing tasks, and then may divide the computing tasks into multiple parts based on a computing capability of each of processors in each of processing groups and send each of the parts to the corresponding processor. Thus, it is possible to ensure that the time at which each of processors in each of processing groups for computing enters the non-idle state is approximately the same, so as to effectively utilize the computing resources of the processing module and to reduce the waste of computing resources.

In some examples, the control module 3 may read and write to the register 222 by a programming language, thereby changing validity of flag bits (sometimes referred to as "register bits") in the register 222 corresponding to the processing group. Thus, it is possible to control the register 222 by the control module 3 (described later). As an example, the above-mentioned programming language may be C language, assembly language, Verilog language or other hardware languages.

As described above, in traditional BSP operations, each of processing nodes sends messages to a controller through Fabric, such as a bus or an on-chip network, which has a large delay. When the number of processing nodes is large, loads of the bus or the on-chip network will be significantly increased, and the controller needs to process the message sent by each of nodes, and therefore, the efficiency of signal transmission between the controller and the nodes is low, and the delay is large, which increases an error of the overall system. In traditional BSP operations, in order to reduce this error, it is necessary to increase the complexity of the software that controls each of nodes, resulting in a further reduction in the efficiency of the overall system. Moreover, the processors 101 in the idle state send the ready signals to the controller through the bus or the on-chip network. When each of processors 101 in the processing group sends the ready signal to the controller simultaneously, the load of the bus or the on-chip network will be increased, which brings a large delay, and the controller needs to process the ready signal from each of processors 101 separately, which further increases the delay.

In the synchronous parallel processing device S according to an embodiment of the present disclosure, the synchronization signal generating module 2 is provided, so that the generation of the synchronization signal occurs in the synchronization signal generating module 2, and the synchronization signal generating module 2 is directly connected to each of processors 101 through dedicated and independent lines (for example, communication hardware lines) without via or occupying a bus or an on-chip network for data transmission. Thus, it is possible to improve the efficiency of synchronized signal transmission of the processors 101, and to reduce the load of the bus or the on-chip network and the power consumption of the chip. Furthermore, the synchronization signal generating module 2 is provided with a group ready signal generating unit 21 and a synchronization signal generating unit 22, so that the synchronization signal generating module 2 may simultaneously process the ready signal from each of processors 101 in all processing groups 10 and accurately send a group synchronization signal to the processing groups that need to perform computing synchronously (described later).

In some examples, the processing node may be at least one of a processing circuit, a processor, a processing chip, and a server. Thus, it is possible to select the implementation of the processing node based on actual applications. In some examples, the processor 101 may be a central processing unit (CPU), a digital signal processor (DSP), a tensor processing unit (TPU), an image processing unit (GPU), an on-chip programmable logic array (FPGA), or a dedicated and customized chip, etc. In some examples, the processing chip may be a processor 101 integrated with multiple cores. For example, the processing chip may be a chip based on a RISC-V multi-core architecture. Specifically, each of processors 101 in the chip is an extended RISC-V core and may support a RISC-V general instruction set. Thus, it is possible to flexibly program the chip based on general RISC-V basic instructions and extended instructions. In addition, in some examples, the server may also be a local server, a cloud server, or a server group distributed in different physical locations and connected via a network, etc., which has an operational capability.

In some examples, the synchronous parallel processing device S may include: a processing module, which has N processing nodes, wherein the N processing nodes are divided into M processing node groups, N is an integer greater than 1, and M is less than or equal to N; and a synchronization signal generating module, which includes a synchronization signal generating unit and M group ready signal generating units; wherein the M group ready signal generating units are in one-to-one correspondence with the M node groups; a first group ready signal generating unit of the M group ready signal generating units is connected to K nodes in a first node group to be synchronized, wherein the first group ready signal generating unit is configured to generate a first to-be-started signal for the first node group to be synchronized, and K is an integer greater than or equal to 1; output terminals of the M group ready signal generating units are connected to the synchronization signal generating unit; and the synchronization signal generating unit generates a first synchronization signal based on the first to-be-started signal, wherein the first synchronization signal is configured to instruct the K nodes in the first node group to start synchronization.

In some examples, the synchronization signal generating module 2 may be implemented in the form of a synchronization signal generating circuit. The synchronization signal generating circuit may include: a synchronization signal generating unit and M group ready signal generating units; wherein the M group ready signal generating units are in one-to-one correspondence with the M node groups; a first group ready signal generating unit of the M group ready signal generating units is connected to K nodes in a first node group to be synchronized, wherein the first group ready signal generating unit is configured to generate a first to-be-started signal for the first node group to be synchronized, and K is an integer greater than or equal to 1; output terminals of the M group ready signal generating units are connected to the synchronization signal generating unit; and the synchronization signal generating unit generates a first synchronization signal based on the first to-be-started signal, wherein the first synchronization signal is configured to instruct the K nodes in the first node group to start synchronization.

In addition, in some examples, the first group ready signal generating unit is configured to generate the first to-be-started signal for the first node group to be synchronized, including: the first group ready signal generating unit is configured to generate the first to-be-started signal based on ready signals from all K nodes in the first node group to be synchronized.

In addition, in some examples, the synchronization signal generating unit may include: M shields (i.e., M shields), M to-be-synchronized group indicating units (i.e., M to-be-synchronized group indicators), and M group synchronization signal generating units (i.e., M group synchronization signal generating sub-circuits); the M to-be-synchronized group indicating units are respectively connected to the M shields; an input terminal of each of the M shields is connected to the output terminals of the M group ready signal generating units; output terminals of the M shields are respectively connected to corresponding units of the M group synchronization signal generating units; a first shield of the M shields outputs a first group quasi-synchronization signal based on an instruction from a first to-be-synchronized group indicating unit connected to the first shield; and a first group synchronization signal generating unit of the M group synchronization signal generating units generates a first group synchronization signal based on the first group quasi-synchronization signal.

In addition, in some examples, the to-be-synchronized group indicating unit may include a register; the register may include at least M register bits, the M register bits are in one-to-one correspondence with the M node groups, and a register bit in the M register bits corresponding to the first node group to be synchronized may be configured as a first value, and register bits in the M register bits corresponding to node groups in the M node groups other than the first node group to be synchronized are configured as a second value.

In addition, in some examples, the first synchronization signal may be configured to instruct the K nodes in the first node group to start synchronization. The first synchronization signal is configured to instruct the K nodes in the first node group to start computing simultaneously, or to start transmitting data simultaneously.

In addition, in some examples, when the processing module 1 is a chip, optionally, the control module 3 may be integrated in the chip. In this case, the chip may include multiple cores and a control module 3. Specifically, the chip may include the synchronization signal generating circuit described above and N processing nodes, wherein the N processing nodes are divided into M processing node groups, N is an integer greater than 1, and M is less than or equal to N. In some examples, the N processing nodes include RISC-V cores.

In addition, in some examples, the chip may further include N first communication hardware lines configured to transmit ready signals from the N processing nodes to the corresponding group ready signal generating unit. In addition, in some examples, the chip may further include N second communication hardware lines configured to transmit the synchronization signals from the synchronization signal generating unit to the corresponding processing nodes.

In addition, in some examples, the chip may further include a control unit configured to change setting of a register. In other examples, the control unit may be configured to control execution and allocation of tasks for each of processing nodes in the processing node group.

Figure 2:
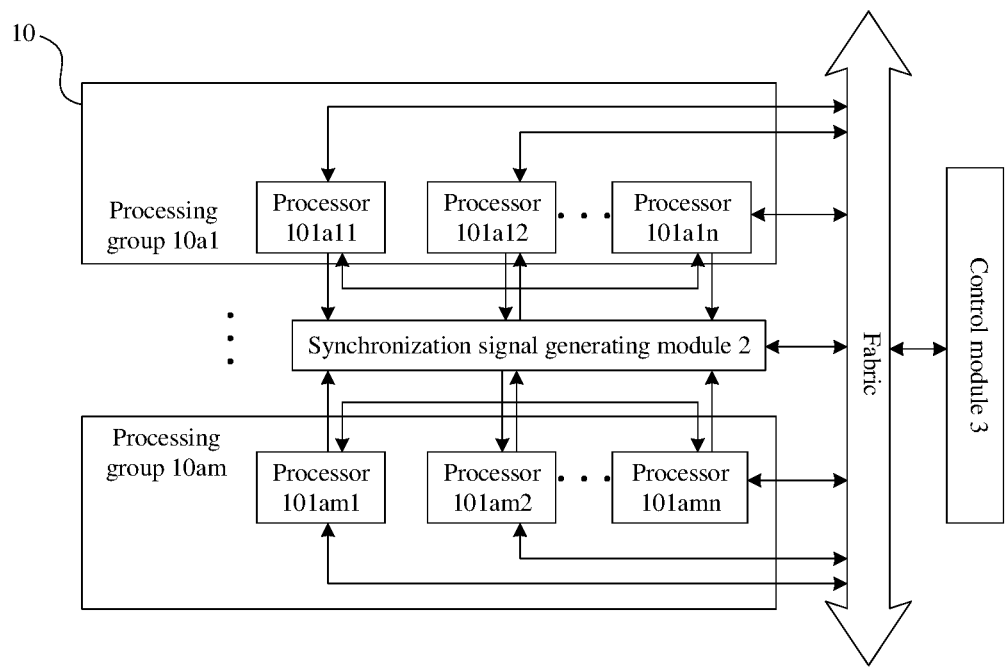
FIG. 2 is a schematic functional block diagram showing a synchronous parallel processing device according to an embodiment of the present disclosure.

FIG. 2 is a schematic functional block diagram showing a synchronous parallel processing device S according to an embodiment of the present disclosure. As shown in FIG. 2, and as described above, the processing module 1 may include at least one processing group 10, and the processing group 10 may include multiple processors 101. In addition, each of processors 101 in the processing group 10 may be in an idle state or in a. Non-idle state, and may generate a ready signal when the processor 101 enters an idle state. Upon receiving the group synchronization signal, each of processors 101 in the processing group 10 enters a non-idle state.

In some examples, the processing module 1 may be a chip having a multi-core architecture and may be divided into multiple processing groups 10, and each of processors 101 in each of processing groups 10 has an independent in-core memory. In this case, a processor 101 may temporarily access data by its own in-core memory.

Optionally, each of processing groups 10 may further include a local memory. In this case, the processing groups 10 may access data by the local memory without exchanging data with an external memory through Fabric, and thus the processing efficiency of the processing groups may be significantly improved.

In addition, the multiple processors 101 on the chip serving as the processing module 1 are divided and grouped, and the number of the divided processing groups refers to the maximum number of groups on a chip. There is no particular limitation on the number of processing groups. The number of processing groups may be preset, for example, may be preset in the chip design process based on an expected application. In addition, in some examples, the number of processors 101 in each of processing groups may be the same. In other examples, the number of processors 101 in each of processing groups may also be different.

In some examples, each of processing groups 10 may include at least one processor 101. Furthermore, the number of processors 101 in each of processing groups 10 may be preset.

In some examples, the chip serving as the processing module 1 may be a chip based on a RISC-V multi-core architecture. At this point, each of processors 101 in the chip may be an extended RISC-V core supporting a RISC-V general instruction set. In this case, it is possible to flexibly program the chip based on general RISC-V basic instructions and extended instructions.

Hereinafter, the processing module 1 according to this embodiment will be described in further detail in conjunction with the specific examples of FIG. 2.

In the synchronous parallel processing device S shown in FIG. 2, the processing module 1 includes m processing groups, namely, a processing group $10a1$, a processing group $10a2$, . . . , and a processing group $10am$. The $m^{th}$ processing group $10am$ includes n processors, that is, a processor $101am1$, a processor $101am2$, . . . , and a processor $101amn$. Hereinafter, the processing group $10a1$ in FIG. 2 will be specifically described as an example.

As shown in FIG. 2, in the processing group $10a1$, each of processors 101 (here, the processor $101a11$, the processor $101a12$, . . . , and the processor $101a1n$) receives a computing task. Each of the processors $101a11$ to $101a1n$ is connected independently to a synchronization signal generating module 2. Specifically, the processors $101a11$ to $101a1n$ may be connected to the synchronization signal generating module 2 via independent hardware lines respectively. When the synchronization signal generating module 2 receives the ready signals sent by all processors 101 (the processor 101a11, the processor 101a12, . . . , and the processor Main) in the processing group 10a 1, the synchronization signal generating module 2 generates a group synchronization signal based on the received ready signals and sends the group synchronization signal to each of processors (the processor 101a11, the processor 101a12, . . . , and the processor 101a1n) in the processing group 10a1. After receiving the group synchronization signal, each of processors (the processor 101a11, the processor 101a12, . . . , and the processor 101a1n) in the processing group 10a1 enters a non-idle state to start processing the allocated computing task.

In some examples, each of processors (the processor 101a11, the processor 101a12, . . . , and the processor 101a1n) may read/write data from/to and temporarily store temporary data during processing to a local memory of the processing group 10a1, and then may send a computing result to a control module 3 through Fabric after the computing is completed.

In some examples, the local memory may be provided as a memory only used by each of processors 101 in one processing group 10. Thus, it is possible to temporarily store the data of the processors 101 in the memory, which improves the computing speed of the processors 101. In other examples, each of the processors 101 in the processing group 10 may read/write data from/to the local memory independently. In addition, in some examples, multiple processing groups may also share a physical memory.

In some examples, the local memory or the used physical memory may be a flash memory, a hard disk type memory, a micro multimedia card type memory, a card type memory (such as a SD or XD memory), a random access memory (RAM), a static random access memory (SRAM), a read only memory (ROM), an electrically erasable programmable read-only memory (EEPROM), a programmable read-only memory (PROM), a replay protected memory block (RPMB), a magnetic memory, a magnetic disk or an optical disk. From the viewpoint of the operating rate, the local memory or the used physical memory preferably is a random access memory or a static random access memory.

In other examples, for a case where the processing node is a server, the local memory may also be a network storage device on a network. In this case, the processing node may perform operations such as access to the memory on the Internet.

In some examples, when the processors 101 enter an idle state after completing the computing and the transmitting, the processors 101 may generate and send ready signals to indicate that the processors 101 are in the idle state. In other examples, the processors 101 may generate and send the ready signals every predetermined time interval when the processors 101 are in the idle state. In addition, in sortie examples, the processors 101 may continuously generate and send the ready signals when the processors 101 are in the idle state.

In some examples, each of processors 101 in the processing group 10 may enter a non-idle state from an idle state after receiving the group synchronization signal, and may start processing the received computing task.

In some examples, a transmitting state is also included after a computing state. In this case, the processors 101 may enter the transmitting state to receive and send data after completing the computing. Thus, it is possible for the processors 101 to send the computed data and receive the computing task. In other examples, the processors 101 enter the idle state after completing the computing and transmitting tasks, and the processors 101 in the idle state may receive a new computing task at any time. In other examples, the transmitting state may also be provided before the computing state.

In some examples, a time period that all processors 101 in each of processing groups 10 enter the non-idle state from the idle state after receiving the group synchronization signal until the next group synchronization signal comes is sometimes referred to as "super-stepping".

In some examples, the processors 101 may include one or more different types of processors. For example, a processor 101 may be a central processing unit (CPU), a tensor processing unit (TPU) or a graphics processing unit (GPU), etc., or may be a processor that combines a central processing unit (CPU) and a graphics processing unit (CPU) or combines a tensor processing unit (TPU) and a graphics processing unit (GPU). In addition, the processor 101 may also be a customized chip, for example, a chip that supports a general instruction set and an extended instruction set of RISC-V.

Figure 3:
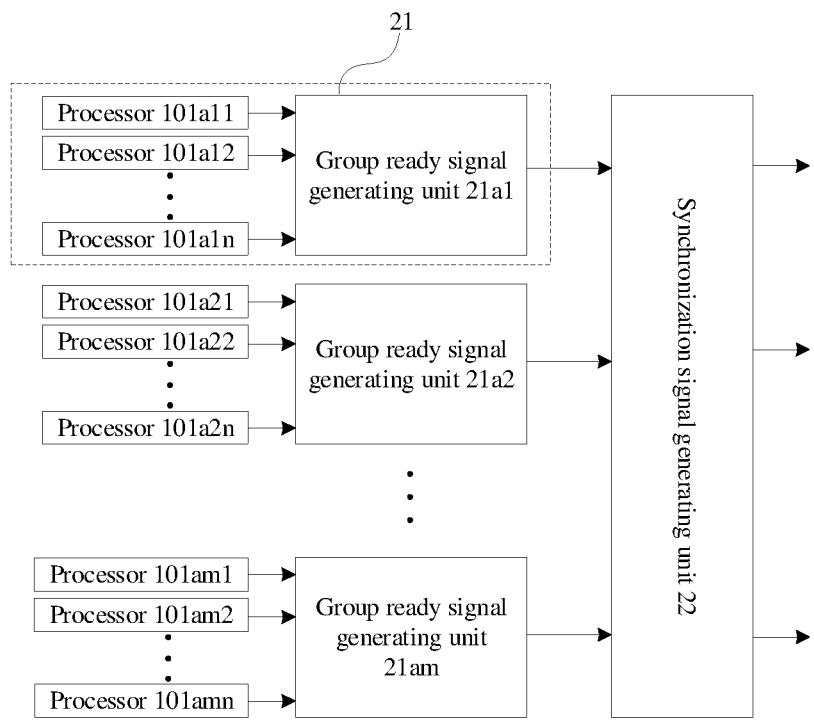
FIG. 3 is a functional block diagram showing a synchronization signal generating module of a synchronous parallel processing device according to an embodiment of the present disclosure.

FIG. 3 is a functional block diagram showing a synchronization signal generating module 2 of a synchronous parallel processing device S according to an embodiment of the present disclosure. As shown in FIG. 3, in this embodiment, the synchronization signal generating module 2 may include a group ready signal generating unit 21 and a synchronization signal generating unit 22. In some examples, the synchronization signal generating module 2 may be connected to all processors 101 in the processing module 1 independently. In other words, the synchronization signal generating module 2 may be connected to all processors 101 in the processing module 1 through independent dedicated hardware lines. In this case, the signal transmission between one processor 101 and the synchronization signal generating module 2 does not interfere with that between another processor 101 and the synchronization signal generating module 2, and each of processors 101 is connected to the synchronization signal generating module 2 without through the fabric, and thus the overall operating efficiency may be improved.

In some examples, the synchronization signal generating module 2 may be a logic circuit configured to generate a group synchronization signal. For example, in one example, the synchronization signal generating module 2 may be implemented by a field programmable logic array (FPGA). In some examples, the group synchronization signal is generated by performing logical operations such as "OR", "AND" or "NOT" and a combination thereof on the ready signals inputted into the synchronization signal generating module 2. In some examples, the group synchronization signal may be a pulse signal or a level signal.

Hereinafter, the synchronization signal generating module 2 according to this embodiment will be described in further detail in conjunction with specific examples of FIG. 3 and FIG. 4.

In the synchronization signal generating module 2 shown in FIG. 3, the synchronization signal generating module 2 includes group ready signal generating units and a synchronization signal generating unit. Firstly, each of group ready signal generating units (a group ready signal generating unit 21a1, a group ready signal generating unit 21a2, . . . , and a group ready signal generating unit 21am) is respectively configured to receive ready signals sent by all processors 101 of the corresponding processing group (the processing groups 10a1 to 10am), and generates a group ready signal and sends the group ready signal to the synchronization signal generating unit 22, and then the synchronization signal generating unit 22 generates a group synchronization signal and sends the group synchronization signal to each of processors in the corresponding processing group. Hereinafter, the group ready signal generating unit 21a1 will be described as an example.

In the synchronization signal generating module 2, the group ready signal generating unit 21a1 receives each of ready signals from all processors (the processor 101a11, the processor 101a12, . . . , and the processor 101a1n), and generates a group ready signal based on all the received ready signals, and sends the group ready signal to the synchronization signal generating unit 22. The synchronization signal generating unit 22 generates a group synchronization signal based on each of the received group ready signals and sends the group synchronization signal to each of processors in the corresponding processing group. As described above, after the synchronization signal generating module 2 sends the group synchronization signal to each of processors (for example, the processor 101a11, the processor 101a12, . . . , and the processor 101a1n), the processors 101 (that is, the processor 101a11, the processor 101a12, . . . , and the processor 101a1n) process the allocated computing tasks synchronously.

Figure 4:
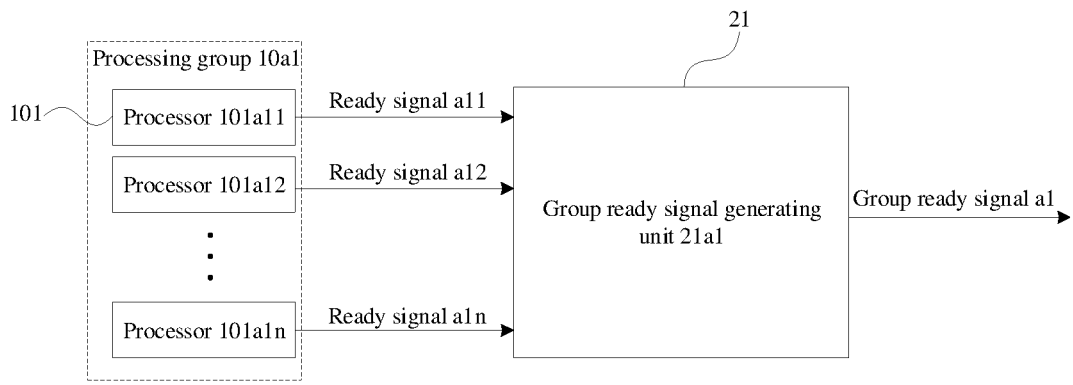
FIG. 4 is a functional block diagram showing a group ready signal generating unit of a synchronous parallel processing device according to an embodiment of the present disclosure.

FIG. 4 is a functional block diagram showing a group ready signal generating unit 21 of a synchronous parallel processing device S according to an embodiment of the present disclosure. As shown in FIG. 4, in this embodiment, the group ready signal generating unit 21 may be connected to each of processors 101 (for example, the processor 101a11, the processor 101a12, . . . , and the processor 101a1n) in the processing group 10 independently. Specifically, the processors 101a11 to 101a1n may be respectively connected to the group ready signal generating unit 21 via independent hardware lines. And then, the group ready signal generating unit 21 may generate a group ready signal based on the ready signal generated by each of processors 101 in the processing group 10.

In some examples, the group ready signal generating unit 21 may generate a group ready signal after receiving the ready signals from all processors 101 (for example, the processor 101a11, the processor 101a12, . . . , and the processor 101a1n) in the processing group 10, in this case, it can be known based on the group ready signal whether all processors 101 in the processing group 10 have entered an idle state, Thus, it is possible to ensure that all processors 101 in the processing group 10 may perform operations synchronously and parallelly.

In some examples, the group ready signal generating unit 21 may correspond to the processing group 10, and each of processors 101 in the processing group 10 is connected independently to the group ready signal generating unit 21. Here, the fact that the group ready signal generating unit 21 may correspond to the processing group 10 means that one group ready signal generating unit 21 corresponds to one processing group 10, and the number of the group ready signal generating units 21 is equal to that of the processing groups 10. In this case, the group ready signal generating unit 21 may simultaneously receive and process the ready signal from each of processors 101 in the corresponding processing group 10. Thus, it is possible for the synchronization signal generating module 2 to simultaneously receive and process the signals from all processing groups 10 of the processing module 1.

As shown in FIG. 4, taking the processing group 10a1 and the group ready signal generating unit 21a1 as an example, each of processors (the processor 101a11, the processor 101a12, . . . , and the processor 101a1n) in the processing group 10a1 respectively generates a ready signal a11, a ready signal a12, . . . , and a ready signal a1n; each of the ready signals is sent independently to the group ready signal generating unit 21a1 corresponding to the processing group 10a1 through an independent hardware line; and after receiving the ready signals from all processors (the processor 101a11, the processor 101a12, . . . , and the processor 101a1n) in the processing group 10a1, that is, after receiving the ready signal a11, the ready signal a12, . . . , and the ready signal a1n, the group ready signal generating unit 21a1 generates a group ready signal a1 which indicates that all processors 101 in the processing group 10a1 are in an idle state. At this point, all processors 101 in the processing group 10a1 are in a state of waiting for synchronizing.

In some examples, the group ready signal generating unit 21 may be directly connected to each of processors 101 in the processing group 10 through an independent dedicated hardware line (first communication hardware line), and the synchronization signal generating unit 22 may be directly connected to each of processors 101 in the processing group 10 through an independent dedicated hardware line. In this case, each of processors 101 in the processing group 10 may send and receive signals through dedicated hardware lines, and thus the interference between signals may be reduced and the efficiency of sending and receiving signals by the processors 101 may be improved.

In some examples, the group ready signal may be generated by performing logical operations such as "OR", "AND" or "NOT" and a combination thereof on the ready signals inputted into the synchronization signal generating module 2. In some examples, the group ready signal may be a pulse signal or a level signal.

Hereinafter, the synchronization signal generating unit 22 according to this embodiment will be described in further detail in conjunction with specific examples of FIG. 5 and FIG. 6.

Figure 5:
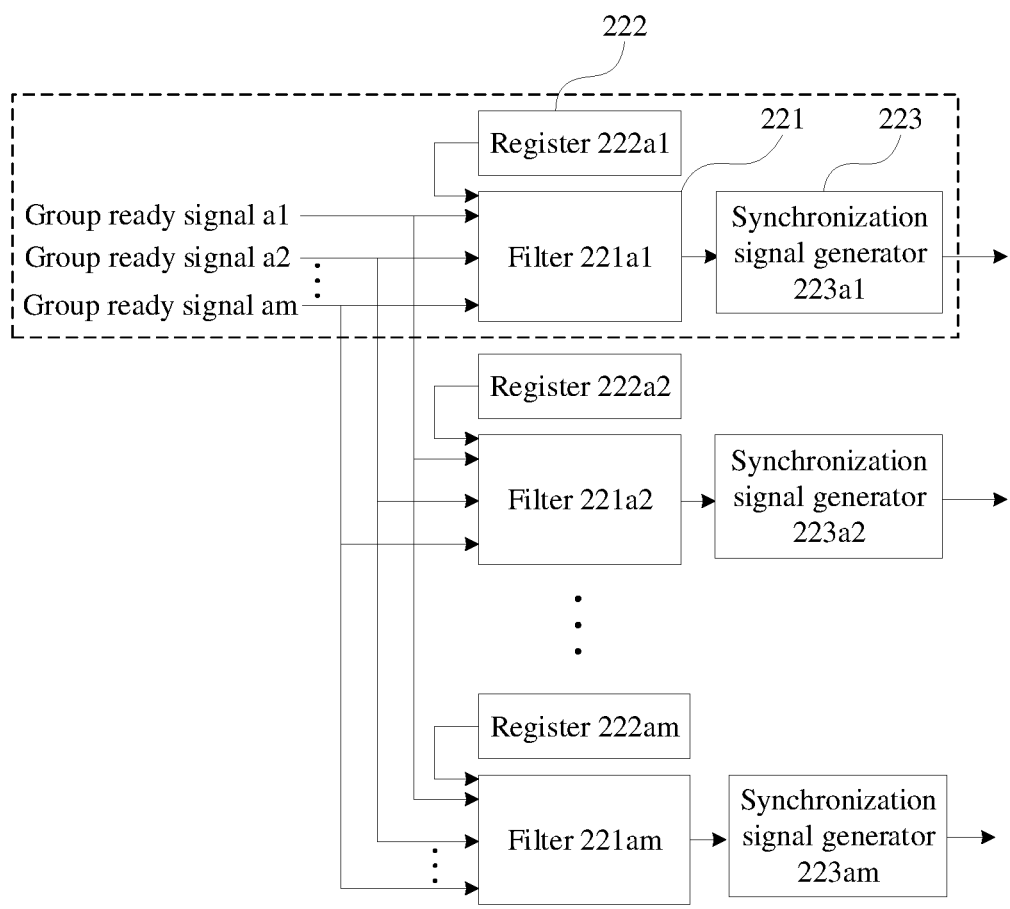
FIG. 5 is a functional block diagram showing synchronization signal generating units of a synchronous parallel processing device according to an embodiment of the present disclosure.

FIG. 5 is a functional block diagram showing a synchronization signal generating unit 22 of a synchronous parallel processing device S according to an embodiment of the present disclosure. As shown in FIG. 5, in this embodiment, the synchronization signal generating unit 22 may be connected to each of processors 101 in the processing group 10 independently, and may receive a group ready signal generated by the group ready signal generating unit 21 and generate a group synchronization signal based on the group ready signal.

In some examples, the synchronization signal generating unit 22 may be connected to the group ready signal generating unit 21. And thus, the synchronization signal generating unit 22 may receive signals from all the group ready signal generating units 21.

In some examples, each of the group ready signal generating units 21 may be connected independently to the synchronization signal generating unit 22. In other examples, the group ready signal generating units 21 may be connected to the synchronization signal generating unit 22 via internal Fabric.

As shown in FIG. 5, a group ready signal a1, a group ready signal a2, . . . , and a group ready signal am are sent to filters (shields) 221a1 to 221am. Here, the filters are sometimes referred to as shields. Each of filters 221 (the filter 221a1, the filter 221a2, and the filter 221am) may receive the group ready signal a1, the group ready signal a2, and the group ready signal am. In addition, a register (a to-be-synchronized group indicating unit) 222a1, a register 222a2, . . . , and a register 222am respectively control the corresponding filters (the filter 221a1, the filter 221a2, . . .

, and the filter 221am), and determine which group ready signals from the filters are valid based on valid bits of the computing tasks allocated by the control module 3. Each of filters (the filter 221a1, the filter 221a2, . . . , and the filter 221am) respectively generates a start signal (a quasi-synchronization signal) after receiving a valid group ready signal, and sends the start signal to a corresponding synchronization signal generator (a group synchronization signal generating unit) (a synchronization signal generator 223a1, a synchronization signal generator 223a2, . . . , and a synchronization signal generator 223am), and then each of synchronization signal generators (the synchronization signal generator 223a1, the synchronization signal generator 223a2, . . . , and the synchronization signal generator 223am) respectively sends the group synchronization signal to each of processors, FIG. 6 is a functional block diagram showing a synchronization signal generating unit 22 of a synchronous parallel processing device S according to an embodiment of the present disclosure. As shown in FIG. 6, in some examples, the synchronization signal generating unit 22 may further include a filter 221 configured to receive and filter group ready signals and a register 222 configured to control whether the group ready signals received by the filter 221 are valid. The filter 221 determines whether to generate a start signal based on the group ready signals and the state of the register 222. In this case, the register 222 may filter the received group ready signals by controlling the filter 221. Thus, it is possible for the synchronization signal generating unit 22 to determine by the filter 221 whether to generate a group synchronization signal.

In some examples, as described above, the group ready signals generated by the group ready signal generating unit 21 may be sent to each of filters 221. In this case, the filters 221 may filter the received group ready signals, and generate a start signal when the received signals are a signal sent from the corresponding group ready signal generating unit 21. Thus, it is possible for each of the filters 221 to filter the group ready signals independently and generate the start signal independently.

In other examples, a filter 221 may correspond to multiple group ready signal generating units 21, and may generate a start signal after the filter 221 receive the corresponding multiple group ready signals.

In addition, in some examples, each of the corresponding group ready signal generating units 21 is connected independently to the group synchronization signal generating unit 223.

In some examples, the start signal is generated by performing logical operations such as "OR", "AND" or "NOT" and a combination thereof on the group ready signals inputted into the filters 221. In some examples, the start signal may be a pulse signal or a level signal.

Figure 6:
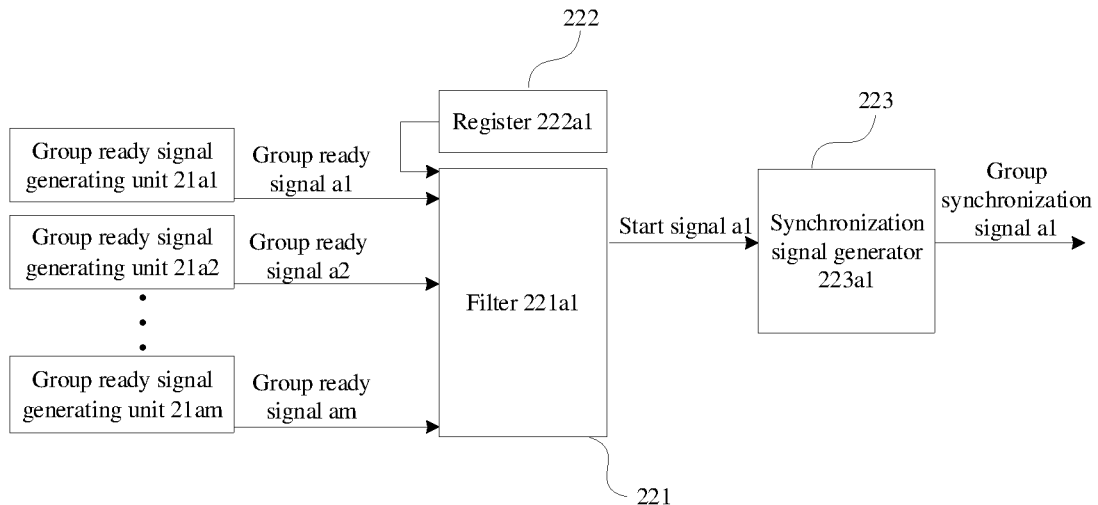
FIG. 6 is a functional block diagram showing a synchronization signal generating unit of a synchronous parallel processing device according to an embodiment of the present disclosure.

As shown in FIG. 6, taking the filter 221a1 and the register 222a1 as an example, each of the group ready signal a1, the group ready signal a2, . . . , and the group ready signal am is sent to the filter 221a1. The filter 221a1, based on setting of the register 222a1 (for example, determined by the control module 3 based on the computing tasks), after receiving a valid group ready signal a1, generates a start signal, and sends the start signal to the corresponding synchronization signal generator (the synchronization signal generator 223a1, the synchronization signal generator 223a2, . . . , the synchronization signal generator 223am), and then the synchronization signal generator 223a1 sends the group synchronization signal to each of processors in this processing group.

Figure 7:
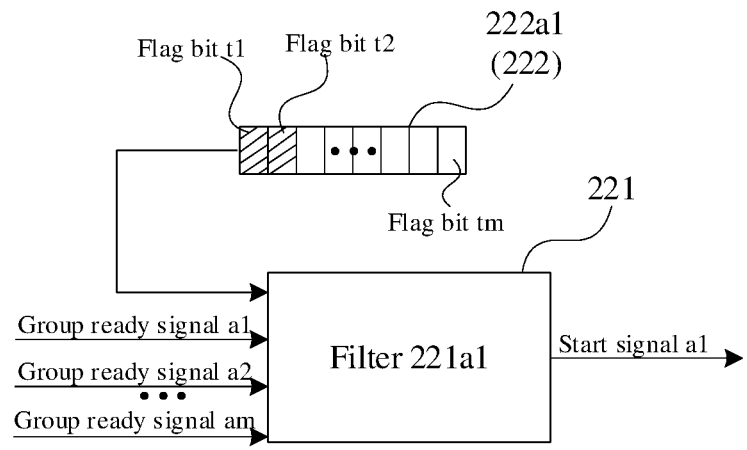
FIG. 7 is a functional block diagram showing a register of a synchronous parallel processing device according to an embodiment of the present disclosure.
Figure 8:
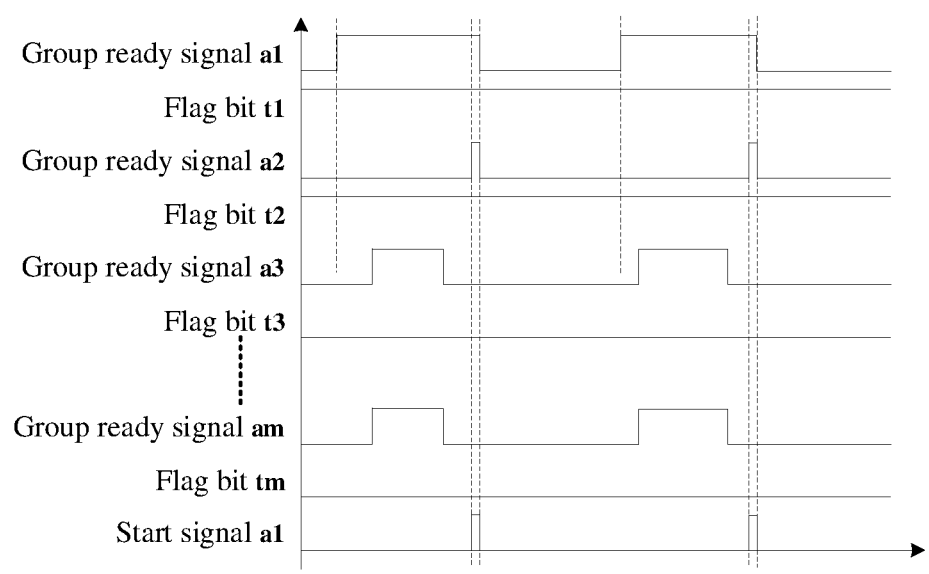
FIG. 8 is a schematic diagram showing a part of signals from a synchronous parallel processing device according to an embodiment of the present disclosure.

FIG. 7 is a functional block diagram showing a register 222 of a synchronous parallel processing device S according to an embodiment of the present disclosure. FIG. 8 is a schematic diagram showing a part of signals from a synchronous parallel processing device S according to an embodiment of the present disclosure.

As shown in FIG. 7, the register 222 may have flag bits at least corresponding to the group ready signal generating units 21. When the flag bit corresponding to the group ready signal generating unit 21 is set to be valid, the filter 221 receives the group ready signal generated by the group ready signal generating unit 21. Thus, it is possible to select the group ready signals that may be received by the filter 221 as required.

In some examples, the register 222 may have flag bits corresponding to the group ready signal generating units 21. For example, the register 222 has m-bit flag bits (a flag bit t1, a flag bit t2, . . . , and a flag bit tm); the flag bit t1 corresponds to the group ready signal a1, the flag bit t2 corresponds to the group ready signal a2, . . . , and the flag bit tm corresponds to the group ready signal am. When a flag bit is set to be valid, the filter 221 shields other invalid group ready signals by reading the valid flag bit, so that the filter 221 may generate a start signal upon receiving the valid group ready signal.

Furthermore, when multiple flag bits of multiple registers 222 are set to be valid, it means that multiple processing groups simultaneously perform synchronous parallel computing. For example, the flag bit t1 and the flag bit t2 of the register 222a1 are valid flag bits, and at this point, for the filter 221a1 controlled by the register 222a1 to generate a start signal, the group ready signal a1 from the group ready signal generating unit 21a1 and the group ready signal a2 from the group ready signal generating unit 21a2 must be received. In this case, after each of processors in the processing group 10a1 enters the idle state, it is necessary to wait for all processors in the processing group 10a2 to enter an idle state before the start signal is generated and in turn the group synchronization signal is generated. Thus, it is possible to control whether the group ready signals received by the filter 221 are valid by setting the flag bits of the register 222, and thus to control a time point when the group synchronization signal is generated.

In some examples, when multiple flag bits of the register 222 are set to be valid, the filter 221 generates a start signal after receiving the group ready signals from multiple group ready signal generating units 21 corresponding to the multiple flag bits. In this case, the filter 221 may be made a barrier in the generation of the group synchronization signals. Thus, it is possible to control the filter 221 by controlling the flag bits of the register 222, and in turn to control a time point when the group synchronization signal is generated.

As mentioned above, when the flag bit a and the flag bit t2 of the register 222a1 are valid flag bits, the flag bit t1 and the flag bit t2 of the register 222a2 may also be set to be valid flag bits. At this point, each of the filter 221a1 and the filter 221a2 may generate a start signal only after receiving the group ready signal a1 from the group ready signal generating unit 21a1 and the group ready signal a2 from the group ready signal generating unit 21a2. In this case, multiple filters 221 may generate start signals simultaneously by setting the flag bits of the register 222. Thus, it is possible for multiple synchronization signal generating units 22 to generate group synchronization signals simultaneously, and in turn to make multiple processing groups 10 enter the non-idle state simultaneously.

In some examples, the register 222 may be selected from one or more of a multi-purpose register, a pointer register, an index register, a special register, a segment register, a control register, a debug register, a task register, a floating point register, a multimedia register, a streaming single-instruction-multiple-data register. Preferably, the register 222 may be a control register.

In some examples, the start signal is generated by performing logical operations such as "OR", "AND" or "NOT" and a combination thereof on the group ready signals inputted into the filter 221 and a flag bit signal of the register 222. In some examples, the flag bit signal may be a pulse signal or a level signal.

Hereinafter, the filter according to this embodiment will be described in further detail in conjunction with FIG. 7 and FIG. 8.

As shown in FIG. 7, taking the filter 221a1 as an example, the group ready signal a1, the group ready signal a2, . . . , and the group ready signal am are sent to the filter 221a1; when the two flag bits (assumed to correspond to the group ready signal generating units 21a1 and 21a2) of the filter 222a1 are set to be valid, the filter 221a1 shields group ready signals other than the group ready signals a1 and a2, and generates the start signal a1 after receiving the group ready signal a1 and the group ready signal a2, and sends the start signal a1 to the corresponding synchronization signal generator 223a1, and then the synchronization signal generator 223a1 sends the group synchronization signal a1 to each of processors 101.

FIG. 8 indicates changes in the input and output of the timing level signals shown in FIG. 7. Taking the case shown in FIG. 8 as an example, the filter 221a1 receives the group ready signal a1, the group ready signal a2, . . . , and the group ready signal am, and the flag bits (the flag bit t1, the flag bit t2, . . . , and the flag bit tm) in the register 222a1 respectively corresponding to the above group ready signals (the group ready signal a1, the group ready signal a2, . . . , and the group ready signal am). The filter 221a1 generates the start signal a1 based on whether the flag bits of the register 222a1 are valid. For example, the flag bit it and the flag bit t2 of the register 222a1 are valid, while the other flag bits t3, t4, . . . , and tm are all invalid, and at this point, the filter 221a1 may only receive the group ready signal a1 and the group ready signal a2 and shield the other group ready signals. The filter 221a1 generates the start signal a1 based on the group ready signal a1 and the group ready signal a2.

In some examples, the group synchronization signal generated by the synchronization signal generating unit 22 may be sent to each of processors 101 in the processing group 10 simultaneously. Thus, it is possible to ensure that each of processors 101 in the processing group 10 starts computing simultaneously.

In some examples, the synchronization signal generating unit 22 may further include a synchronization signal generator 223 which is connected to the filter 221 and receives a start signal. The synchronization signal generator 223 generates a group synchronization signal based on the start signal and sends the group synchronization signal to each of processors 101 in the processing group 10. The synchronization signal generator 223 are connected to each of processors 101 in the processing group 10 independently, for example through second communication hardware lines. In this case, the synchronization signal generator 223 is only connected to each of processors 101 in the corresponding processing group 10 independently and respectively. Thus, it is possible to ensure that the generated group synchronization signal is accurately sent to each of the processors 101 in the corresponding processing group 10, and the transmission rate of the group synchronization signal is improved.

In some examples, each filter 221 is connected to a synchronization signal generator 223. Further, since a filter 221 corresponds to a processing group 10, a synchronization signal generator 223 corresponding to the filter 221 corresponds to the processing group 10.

In some examples, the synchronization signal generator 223 may be connected to each of processors 101 in the corresponding processing group 10 independently. In this case, the group synchronization signal may be directly sent to each of processors 101 in the processing group 10 corresponding to the synchronization signal generator 223. Thus, it is possible to further reduce the delay of signal transmission.

In some examples, the group synchronization signal is generated by performing logical operations such as "OR", "AND" or "NOT" and a combination thereof on the start signal inputted into the synchronization signal generator 223. In some examples, the group synchronization signal may be a pulse signal or a level signal.

In some examples, the flag bits of the register 222 may be controlled by the control module 3. Thus, it is possible to control the state of the register 222 by controlling the flag hits of the register 222 by the control module 3.

In some examples, the control module 3 may be communicatively connected to the processing module 1 and the synchronization signal generating module 2 through Fabric. In this case, the control module 3 may exchange data with the processing module 1 and the synchronization signal generating module 2 through Fabric. In some examples, the processors 101 in the processing module 1 may send a computing result through Fabric after completing the computing.

In other examples, the control module 3 may further include a wireless communication unit. In this case, the control module 3 may send and receive data through wireless signals.

In some examples, the control module 3 may be a top micro control unit (MCU) of a chip, a main control circuit (Host) located outside the chip, other chips, or other program applications (Server).

Figure 9:
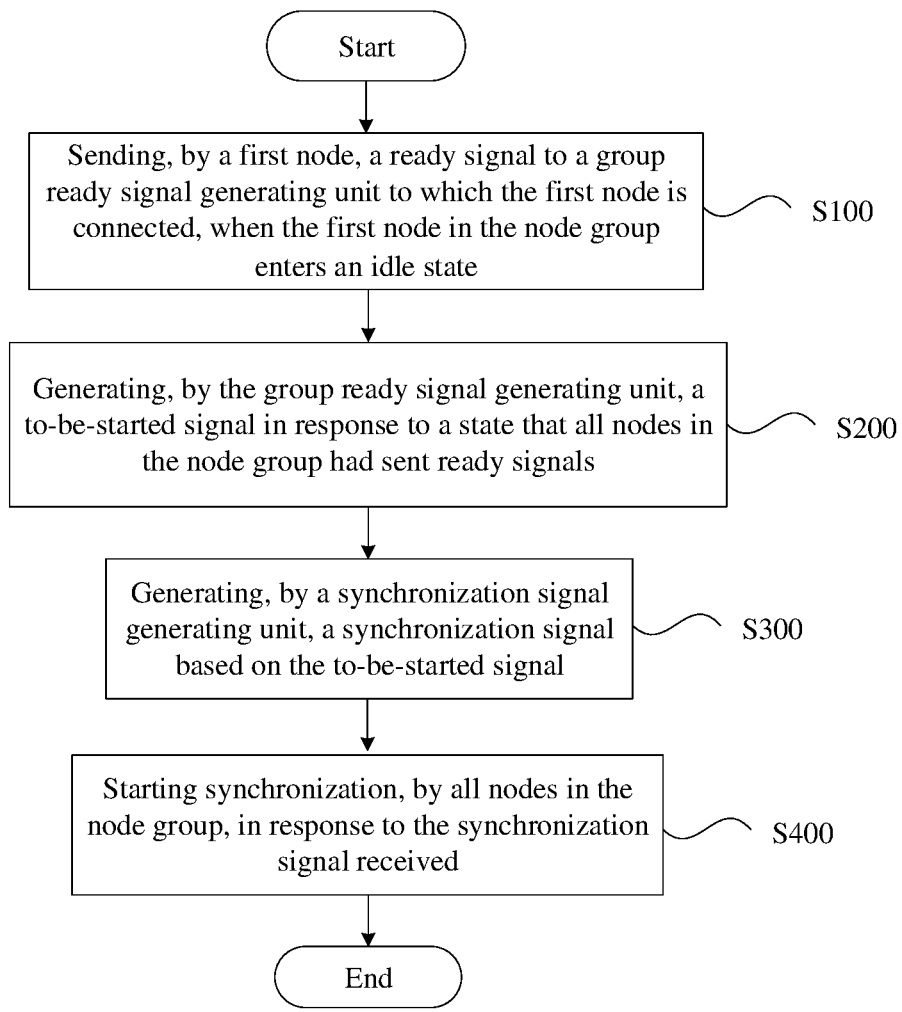
FIG. 9 is a flowchart showing a synchronous parallel processing control method according to an embodiment of the present disclosure.

Hereinafter, a synchronous parallel processing control method for the synchronous parallel processing device S based on the above-mentioned multi-core architecture is analyzed in conjunction with FIG. 9. FIG. 9 is a flowchart showing a synchronous parallel processing control method according to an embodiment of the present disclosure.

As shown in FIG. 9, a synchronous parallel processing control method for the synchronous parallel processing device S based on the above-mentioned multi-core architecture includes the following steps of, sending (S100), by a first node, a ready signal to the group ready signal generating unit 21 to which the first node is connected, when the first node in the node group enters an idle state; generating (S200), by the group ready signal generating unit 21, a to-be-started signal in response to a state that all nodes in the node group have sent ready signals; generating (300), by a synchronization signal generating unit 22, a synchronization signal based on the to-be-started signal; and starting synchronization (S400), by all nodes in the node group, in response to the synchronization signal received.

With respect to the synchronous parallel processing control method according to the present disclosure, each of the processors (nodes) 101 in the processing group (node group) 10, upon entering an idle state, independently sends a ready signal to the group ready signal generating unit 21 of the synchronization signal generating module 2 corresponding to the processing group 10; The group ready signal generating unit 21 generates a group ready signal after receiving the ready signals from all processors 101 in the processing group 10 corresponding thereto; and the synchronization signal generating unit 22 receives the group ready signal and generates a corresponding group synchronization signal and finally sends the group synchronization signal to all processors 101 in the processing group 10, so that the processors 101 start synchronization. Thus, it is possible for the synchronization signal generating unit 22 to process multiple group ready signals simultaneously, and it is possible to independently transmit signals by the group ready signal generating units and the synchronization signal generating unit 22.

In step S100, each of processors 101 in the processing group 10 sends a ready signal, when each of processors 101 in the processing group 10 enters an idle state. Here, for the setting of the processing group 10 and the setting of each of processors 101 in the processing group 10, reference may be made to the description for the above-mentioned processing module 1 for details, which will not be repeated here.

In some examples, when the processors 101 start synchronization, the processors 101 perform computing or transmitting, and enter an idle state after completing the computing. In this case, the processors 101 after completing the computing and transmitting may wait for other processors 101 which are computing or transmitting. Thus, it is possible for the processors 101 to simultaneously start synchronization when the next group synchronization signal comes.

In step S200, the ready signal sent by each of processors 101 the processing group 10 is received by the group ready signal generating unit 21, and when the group ready signal generating unit 21 receives the ready signals sent by all processors 101 in the processing group 10, the group ready signal generating unit 21 generates a group ready signal. Here, for the setting of the group ready signal generating unit 21, reference may be made to the above description for the group ready signal generating unit 21 for details, which will not be repeated here.

In step S300 and step S400, the synchronization signal generating unit 22 receives the group ready signal, and generates the group synchronization signal based on the group ready signal and sends the group synchronization signal to each of processors 101 in the processing group 10. Each of processors in the processing group 10 starts synchronizing upon receiving the group synchronization signal, Here, for the setting of the synchronization signal generating unit 22, reference may be made to the above description for the synchronization signal generating unit 22 for details, which will not be repeated here.

In some examples, the computing tasks are allocated to each of processors 101 in the processing group 10, and each of processors 101 in the processing group 10 is used to perform computing. Thus, it is possible for each of processors 101 in the processing group 10 to complete the computing locally.

In some examples, when the control module 3 controls the register to make the flag bit of the register valid, the filter having the register receives the group ready signal which is generated by the group ready signal generating unit corresponding to the flag bit. Thus, it is possible to control the validity of the group ready signal received by the filter by controlling the register.

Furthermore, in some examples, the present disclosure further provides a computing device including a processor and a memory, wherein the processor executes computer instructions stored in the memory, so that the computing device executes the synchronous parallel processing control method described above in the present disclosure.

Furthermore, in some examples, the present disclosure further provides a computer readable storage medium storing a computer program which, when executed by a processor, implements the steps of the synchronous parallel processing control method described above in the present disclosure.

Furthermore, in some examples, the present disclosure further provides a computer program product including computer instructions which, when executed by a computing device, cause the computing device to execute the synchronous parallel processing control method described above in the present disclosure.

In the above examples, the description for each of examples has its own focus. For parts that are not described in detail in an example, reference may be made to the related description of other examples.

It should be noted that, the foregoing method examples are sometimes expressed as a series of combinations of actions for the sake of simple description, but those skilled in the art should appreciate that the present application is not limited by the described sequence of actions, because some steps may be performed in a different sequence or simultaneously according to the present application. Secondly, those skilled in the art should also appreciate that the examples described in the specification are all preferred examples, and the actions and modules involved are not necessarily required by the present application.

In the several examples provided in the present application, it should be understood that, the disclosed device may be implemented in other ways. For example, the device examples described above are only illustrative. For example, the above division of the units is only a logical function division. In actual implementations, there may be other division methods, for example, multiple units or components may be combined or may be integrated into another system, or some features may be ignored or not be implemented. In addition, the shown or discussed mutual coupling or direct coupling or communication connection may be indirect coupling or communication connection through some interfaces, devices or units, and may also be in an electrical form or in other forms.

The units described above as separate components may or may not be physically separated, and the components shown as units may or may not be physical units, that is, the units may be located in one place, or the units may be distributed on multiple network units. Some or all of the units may be selected based on actual needs to achieve the purpose of the solution of the embodiments.

In addition, the functional units in the examples of the present application may be integrated into one processing unit, or the functional units may exist alone physically, or two or more functional units may be integrated into one unit. The above-mentioned integrated unit may be implemented in the form of hardware or in the form of a software functional unit.

The invention claimed is:

1. A synchronization signal generating circuit for generating a synchronization signal for M node groups, each of the node groups comprising at least one node, and M being an integer greater than or equal to 1, wherein a first node group in the M node groups comprises K nodes, and K is an integer greater than or equal to 1, and the node is a core a processor;

the synchronization signal generating circuit comprises: a synchronization signal generating sub-circuit and M group ready signal generating sub-circuits;

the M group ready signal generating sub-circuits are in one-to-one correspondence with the M node groups;

a first group ready signal generating sub-circuit of the M group ready signal generating sub-circuits is connected to K nodes in the first node group to be synchronized, wherein the first group ready signal generating sub-circuit is configured to generate a first to-be-started signal for the first node group to be synchronized;

output terminals of the M group ready signal generating sub-circuits are connected to the synchronization signal generating sub-circuit; and the synchronization signal generating sub-circuit generates a first synchronization signal based on the first to-be-started signal, wherein the first synchronization signal is configured to instruct the K nodes in the first node group to start synchronization;

the synchronization signal generating sub-circuit comprises: M shields, M to-be-synchronized group indicators, and M group synchronization signal generating sub-circuits;

the M to-be-synchronized group indicators are respectively connected to the M shields;

an input terminal of each of the M shields is connected to the output terminals of the M group ready signal generating sub-circuits;

an output terminal of each of the M shields is connected to the input terminals of the M group synchronization signal generating sub-circuits;

a first shield of the M shields outputs a first group quasi-synchronization signal based on an instruction from a first to-be-synchronized group indicator connected to the first shield; and a first group synchronization signal generating sub-circuit of the M group synchronization signal generating sub-circuits generates a first group synchronization signal based on the first group quasi-synchronization signal;

each of the M to-be-synchronized group indicator comprises a register; and wherein the register comprises at least M register bits, the M register bits are in one-to-one correspondence with the M node groups, and a register bit in the M register bits corresponding to the first node group to be synchronized is configured as a first value, and register bits in the M register bits corresponding to node groups in the M node groups other than the first node group to be synchronized are configured as a second value.

2. The synchronization signal generating circuit according to claim 1, wherein the first group ready signal generating sub-circuit is configured to generate the first to-be-started signal based on ready signals from all K nodes in the first node group to be synchronized.

3. The synchronization signal generating circuit according to claim 1, wherein the first synchronization signal is configured to instruct the K nodes in the first node group to start computing simultaneously, or to start transmitting data simultaneously.

4. The synchronization signal generating circuit according to claim 1, wherein the each of the node groups includes a local memory.

5. The synchronization signal generating circuit according to claim 1, wherein each of the node in the M node groups supports a RISC-V general instruction set.

6. The synchronization signal generating circuit according to claim 1, wherein the each of the node groups is connected to the corresponding group ready signal generating sub-circuit through an independent hardware lines respectively.

7. The synchronization signal generating circuit according to claim 1, wherein a shield is a filter; and the shield is configured to filter a plurality of the first groups from the M node groups.

8. A chip, comprising: a synchronization signal generating circuit according to claim 1 and N processing nodes, wherein the N processing nodes are divided into M processing node groups, N is an integer greater than 1, and M is less than or equal to N.

9. A synchronous parallel processing control method based on a multi-core architecture, being a synchronous parallel processing control method based on a synchronization signal generating circuit according to claim 1, the method comprising:

sending, by a first node, a ready signal to a group ready signal generating sub-circuit to which the first node is connected, when the first node in the node group enters an idle state;

generating, by the group ready signal generating sub-circuit, a to-be-started signal in response to a state that all nodes in the node group have sent ready signals;

generating, by a synchronization signal generating sub-circuit, a synchronization signal based on the to-be-started signal; and starting synchronization, by all nodes in the node group, in response to the synchronization signal received.

10. The synchronization signal generating circuit according to claim 4, wherein the local memory is a random access memory or a static random access memory.

11. The chip according to claim 8, wherein the chip further comprises N first communication hardware lines configured to transmit ready signals from the N processing nodes to corresponding group ready signal generating sub-circuit.

12. The chip according to claim 11, wherein the chip further comprises N second communication hardware lines configured to transmit synchronization signals from the synchronization signal generating sub-circuit to corresponding processing nodes.

13. The chip according to claim 8, wherein the synchronization signal generating circuit comprises M registers, the chip further comprises a controller configured to change settings of the M registers.

14. The chip according to claim 8, wherein the chip further comprises a controller configured to control execution and allocation of tasks for each of processing nodes in a processing node group.

15. The chip according to claim 8, wherein the N processing nodes comprise RISC-V cores.

16. The chip according to claim 13, wherein the controller controls the flag bits of each register in the M registers to control the state of each register.

17. The chip according to claim 13, wherein the controller communicates with the N processing nodes and the synchronization signal generating circuit through Fabric.

18. The synchronous parallel processing control method according to claim 9, wherein the method comprising:

sending, by a first node, a ready signal to a group ready signal generating sub-circuit to which the first node is connected through an independent hardware line.

* * * * *